(12) United States Patent
Jeong

(10) Patent No.: US 10,889,180 B2
(45) Date of Patent: Jan. 12, 2021

(54) TILTABLE ACTIVE AIR FLAP ASSEMBLY

(71) Applicants: Hyundai Motor Company, Seoul (KR); KIA Motors Corporation, Seoul (KR)

(72) Inventor: Ji-Min Jeong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/586,116

(22) Filed: Sep. 27, 2019

(65) Prior Publication Data
US 2020/0130499 A1    Apr. 30, 2020

(30) Foreign Application Priority Data

Oct. 26, 2018   (KR) .................... 10-2018-0129253

(51) Int. Cl.
*B60K 11/08* (2006.01)
*B60K 11/06* (2006.01)
*F24F 13/15* (2006.01)
*F24F 13/14* (2006.01)

(52) U.S. Cl.
CPC ............ *B60K 11/085* (2013.01); *B60K 11/06* (2013.01); *F24F 13/1413* (2013.01); *F24F 13/1426* (2013.01); *F24F 13/15* (2013.01); *F24F 2013/1433* (2013.01); *F24F 2013/1446* (2013.01)

(58) Field of Classification Search
CPC ........ B60K 11/085; B60K 11/06; F24F 13/15; F24F 2013/1446; F24F 13/1426; F24F 2013/1433; F24F 13/1413
See application file for complete search history.

(56) References Cited

U.S. PATENT DOCUMENTS

2017/0106458 A1*   4/2017   Duan .................... B23D 53/06

FOREIGN PATENT DOCUMENTS

| KR | 20140049829 A | | 4/2014 | |
|---|---|---|---|---|
| KR | 20150070769 A | | 6/2015 | |
| WO | WO-2010034489 A1 | * | 4/2010 | ........... B60K 11/085 |

* cited by examiner

*Primary Examiner* — Jacob M Amick
*Assistant Examiner* — Charles Brauch
(74) *Attorney, Agent, or Firm* — Brinks Gilson & Lione

(57) ABSTRACT

A tiltable active air flap assembly may include an air flap unit having a plurality of air flaps rotatably installed in a manner of being arranged parallel to each other and rotating simultaneously such that running wind flows into an engine room through a radiator grille of a vehicle or the running wind is blocked; a drive motor; a power transmission means for transmitting rotational force of the drive motor to any one of the plurality of air flaps; and a tilting means for moving any one of upper and lower ends of the air flap unit along a longitudinal direction of the vehicle when each of the air flaps rotates to close the radiator grille.

13 Claims, 7 Drawing Sheets

TILTABLE ACTIVE AIR FLAP ASSEMBLY

CROSS-REFERENCE TO RELATED APPLICATIONS

This application claims priority to and the benefit of Korean Patent Application No. 10-2018-0129253, filed on Oct. 26, 2018, which is incorporated herein by reference in its entirety.

FIELD

The present disclosure relates to control of air flow into an engine room through a radiator grille of a vehicle.

BACKGROUND

The statements in this section merely provide background information related to the present disclosure and may not constitute prior art.

In a vehicle equipped with an engine, the engine can be maintained at a proper temperature by cooling coolant discharged from the heated engine in a radiator grille arranged at the front of the vehicle and then forcing the coolant to flow back to the engine to cool the engine.

The radiator grille is generally always opened and as a result, air flowing into an engine room through the radiator grille acts as running resistance of the vehicle.

Moreover, although the engine is not required to be cooled when the engine is in cold condition or an electric motor of a hybrid vehicle is operating, air flows into the engine room through the opened radiator grille and as a result, running resistance is increased.

In some cases, an active air flap assembly is installed such that air is selectively introduced into an engine room 11 as shown in FIG. 1.

In the active air flap assembly, a plurality of air flaps 121 are rotatably installed at the rear of a radiator grille 12 in the engine room 11 in such a manner that they are opened when running wind is needed to flow into the engine room 11 whereas each of the air flaps 121 is turned to be in contact with other adjacent air flaps so as to prevent or inhibit running wind from flowing into the engine room 11 when inflow of the running wind is not needed.

However, the air flap assembly in the prior art, in some instances, does not adequately block inflow of the running wind introduced into the radiator grille 12 into the engine room 11 and thus air flows into the engine room 11.

The radiator grille 12 is formed in a curved shape when viewed in cross section as shown by line A-A in FIG. 1. Therefore, the air flap 121 located at the lower portion is disposed to be spaced apart far from the radiator grille 12 as compared to the air flap 121 located at the upper portion. Moreover, in recent years, a start, stop and coasting (SSC) module 31, a front camera and the like are installed on the radiator grille 12 for securing functions related to autonomous driving or driving comfort. As a result, there is a difficulty in disposing the air flap 121 to be located at the lower portion in a further forward position in order to avoid interference.

Accordingly, even when the air flaps 121 are closed, running wind flows into the engine room through a space between a lower end of the air flap assembly and the radiator grille 12 or between the lower end of the air flap assembly and a back beam 14 supporting a bumper 15.

As such, although the air flap assembly is operated (in other words, the air flaps close the radiator grille), running wind flows into the engine room 11 so that aerodynamic performance of the vehicle is deteriorated due to inflow of the running wind and this causes fuel efficiency to be deteriorated.

The above information disclosed in this Background section is only for enhancement of understanding of the background of the present disclosure, and therefore it may contain information that does not form the prior art that is already known to a person of ordinary skill in the art.

SUMMARY

The present disclosure provides a tiltable active air flap assembly configured such that when air flaps are operated, they are tilted so that no gap is formed between the air flaps and components inside an engine room.

The present disclosure can be understood by the following description and become apparent with reference to the various forms of the present disclosure.

In accordance with one aspect of the present disclosure, there is provided a tiltable active air flap assembly comprising: an air flap unit having a plurality of air flaps rotatably installed in a manner of being arranged parallel to each other and rotating simultaneously such that running wind flows into an engine room through a radiator grille of a vehicle or the running wind is blocked; a drive motor; a power transmission means for transmitting rotational force of the drive motor to any one of the plurality of air flaps; and a tilting means for moving any one of upper and lower ends of the air flap unit along a longitudinal direction of the vehicle when each of the air flaps rotates to close the radiator grille.

The tiltable active air flap assembly is characterized in that the tilting means comprises an output gear coupled to a rotating shaft of any one of the air flaps and a curved rack gear meshed with one side of the output gear and installed fixedly in a housing.

The tiltable active air flap assembly is characterized in that the output gear comprises a pinion part to which rotational force of the drive motor is input and a sector gear part formed integrally with the pinion part and meshed with the curved rack gear.

The tiltable active air flap assembly is characterized in that radius of the curved rack gear is larger than that of the sector gear part.

The tiltable active air flap assembly is characterized in that the curved rack gear is formed in a curved shape whose height increases along the longitudinal direction of the vehicle.

The tiltable active air flap assembly is characterized in that a plurality of power transmission means for transmitting rotational force of the drive motor to the output gear are provided between the drive motor and the pinion part.

The tiltable active air flap assembly is characterized in that at least one gear member is provided between the drive motor and the pinion part.

The tiltable active air flap assembly is characterized in that a driving gear is mounted to a rotating shaft of the drive motor and an intermediate gear for transmitting rotational force of the driving gear to the output gear is provided between the driving gear and the pinion part.

The tiltable active air flap assembly is characterized in that an intermediate gear guide groove and an output gear guide groove are formed in the housing to guide revolution of the intermediate gear and the output gear around the driving gear when the intermediate gear and the output gear rotate on their respective axis.

The tiltable active air flap assembly is characterized in that the output gear is coupled to a rotating shaft of the air flap located at the lowermost position out of the air flaps.

The tiltable active air flap assembly is characterized in that one side of the air flap located at the uppermost position out of the air flaps is rotatably installed in the housing.

The tiltable active air flap assembly is characterized in that the curved rack gear is formed in a curved shape whose height increases toward the front of the vehicle.

The tiltable active air flap assembly is characterized in that one sides of the air flaps are linked to each other by interlocking links respectively such that the air flaps are interlocked to each other.

The tiltable active air flap assembly is characterized in that the upper adjacent air flaps are linked to each other by an interlocking link at one end side of left and right end sides of the air flaps, while the lower adjacent air flaps are linked to each other by an interlocking link at the other end of the left and right ends of the air flaps.

The tiltable active air flap assembly having the features as described above according to the present disclosure makes it possible for the air flaps to be tilted when the air flaps are operated (in other words, when the air flaps close the radiator grille) so that the upper or lower end of the air flaps to be deployed is brought into close contact with components inside the engine room.

In this way, the upper or lower end of the air flaps can be in close contact with the components inside the engine room so that once the air flaps are operated, it is possible to prevent or inhibit air from flowing into the engine room, thereby improving aerodynamic performance of the vehicle.

As the aerodynamic performance of the vehicle is improved, fuel efficiency of the vehicle is improved accordingly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
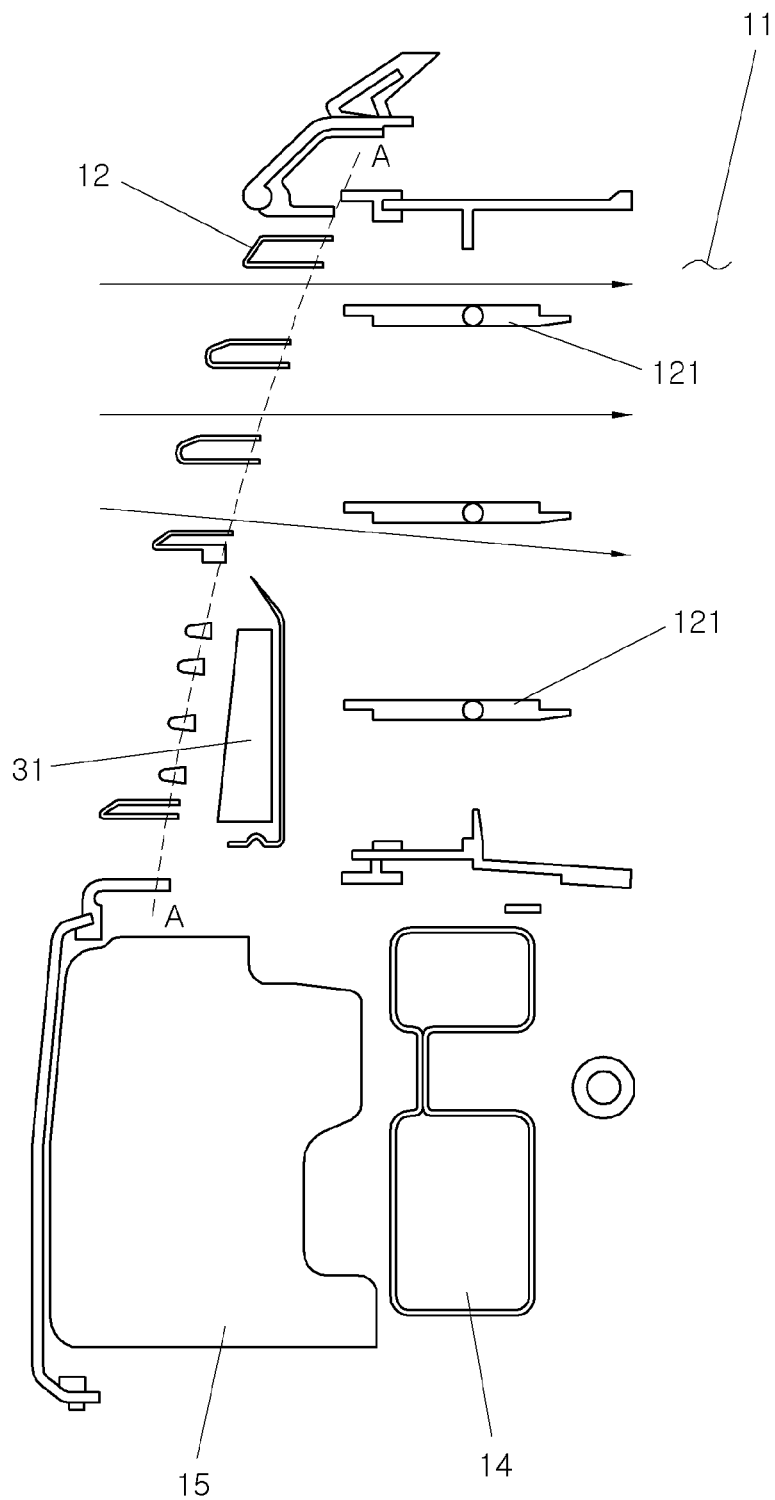
FIG. 1 is a cross-sectional view showing a state in which air flaps according to the prior art are installed inside an engine room.
Figure 2:
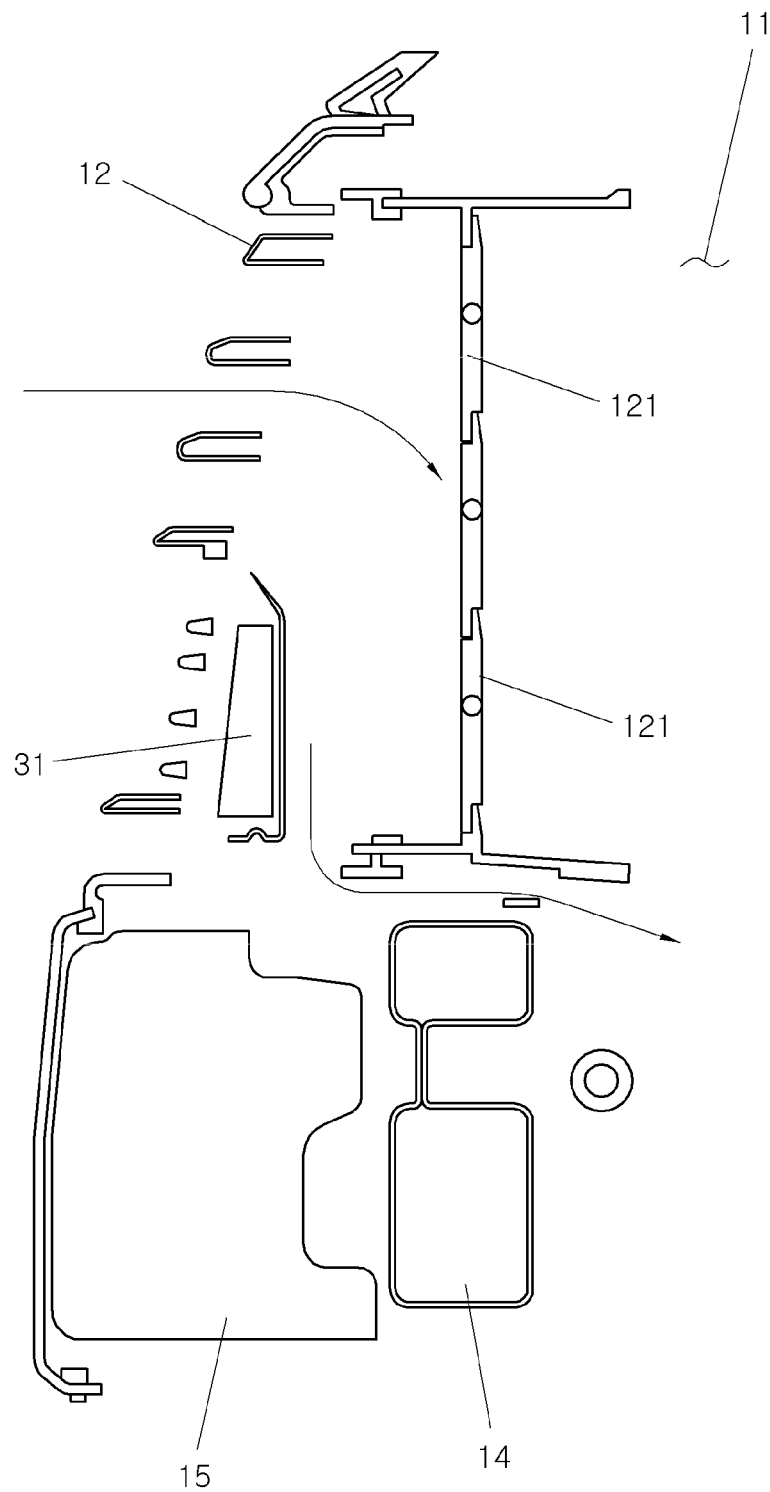
FIG. 2 is a cross-sectional view showing a state in which air flaps according to the prior art are deployed.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a tiltable active air flap assembly according to a form of the present disclosure is described in detail with reference to the accompanying drawings.

A tiltable active air flap assembly 20 according to a form of the present disclosure comprises an air flap unit 21 having a plurality of air flaps 21a rotatably installed in a manner of being arranged parallel to each other and rotating simultaneously such that running wind flows into an engine room through a radiator grille 12 of a vehicle or the running wind is blocked; a drive motor 24; a power transmission means for transmitting rotational force of the drive motor 24 to any one of the plurality of air flaps 21a; and a tilting means for moving any one of upper and lower ends of the air flap unit 21 along a longitudinal direction of the vehicle when each of the air flaps rotates 21a to close the radiator grille 12.

A plurality of air flaps 21a are provided inside the engine room 11. The plurality of air flaps 21a are arranged along a vertical direction of the vehicle behind the radiator grille 12 in the engine room 11.

The air flaps 21a are rotatably installed in such a manner that running wind can flow into the engine room 11 when the air flaps are in parallel to the ground (that is, an open configuration). On the other hand, when the air flaps are substantially vertical to the ground and in contact with other adjacent air flaps 21a in the vertical direction (that is, a closed configuration), inflow of air into the engine room 11 through the radiator grille 12 is blocked.

The air flaps 21a are installed to interlock with each other through interlocking links 22 respectively. The air flaps 21a are interlocked with each other in such a manner that they are maintained at the same rotation angle. An interlocking link 22 for interlocking the air flaps 21a is linked to one side of the air flaps 21a so that the air flaps 21a rotate simultaneously at the same angle.

Accordingly, one unit of the air flaps 21a interlocking with each other constitutes an air flap unit 21 so that they simultaneously rotate to open or close the radiator grille 12. The air flap unit 21 may be tilted in such a manner that a lower end of the air flap unit moves in a longitudinal direction of the vehicle with respect to an upper end thereof. If desired, the air flap unit may be tilted in such a manner that the upper end of the air flap unit 21 moves in a longitudinal direction of the vehicle with respect to the lower end thereof.

A rotating shaft of one air flap 21a out of the air flaps 21a, to which tilting of the air flap unit 21 is not transferred, for example, the uppermost air flap 21a may be rotatably installed in the housing 29, in which the air flap unit 21 is installed, through a ball bearing 23. In this case, the uppermost air flap 21a may be coupled to the housing 29 by means of the ball bearing 23.

The tilting means forces either one of the upper and lower ends of the air flap unit 21 to move along the longitudinal direction of the vehicle when the air flaps 21a of the air flap unit 21 are rotated to close the radiator grille 12. This aspect shows an example in which the tilting means forces the lower end of the air flap unit 21 to move toward the front of the vehicle. When the tilting means forces the lower end of the air flap unit 21 to move toward the front of the vehicle whereby the end of the air flap 21*a* located at the lowermost position out of the air flaps 21*a* is brought into contact with the radiator grille 12 or the back beam 14 supporting the bumper 15, the air flap 21*a* inhibits or prevents air from flowing through a space between structures inside the engine room 11 once the air flap is operated (in other words, the air flap closes the radiator grille).

A specific example of the tilting means may be an output gear 27 for rotating the air flap 21*a* and a curved rack gear 28 provided inside the engine room 11 to be meshed with the output gear 27.

The output gear 27 is coupled to the drive motor 24 for rotating the air flap 21*a* via the power transmission means such as a driving gear 25 mounted to a rotating shaft of the drive motor 24 and an intermediate gear 26 meshed with the driving gear 25 so that it is rotated by the drive motor 24. The output gear 27 is formed with a pinion part 27*a* to be meshed with the intermediate gear 26 so that the output gear 27 can be rotated when the drive motor 24 rotates. A rotating shaft of the output gear 27 is coupled to any one of the air flaps 21*a* to rotate the air flap 21*a*. Since the air flaps 21*a* are configured to be interlocked with each other, even if only one of the air flaps 21*a* is rotated, the remaining air flaps 21*a* are also rotated simultaneously with it.

The output gear 27 is formed with a sector gear part 27*b*. The sector gear part 27*b* is formed integrally with the pinion part 27*a* and has the same center of rotation as the pinion part 27*a*. The sector gear part 27*b* is configured such that the output gear 27 is meshed with the curved rack gear 28 between an angle at which the air flap unit 21 fully opens the radiator grille 12 and an angle at which the air flap unit closes the radiator grille 12.

The intermediate gear 26 and the output gear 27 revolve around the driving gear 25 by means of guide grooves 29*a* and 29*b* formed in the housing 29, respectively. The guide grooves formed in the housing 29 are of an intermediate gear guide groove 29*a* taking a rotating shaft of the driving gear 25 as a centroid and receiving a rotating shaft of the intermediate gear 26 and an output gear guide groove 29*b* taking the rotating shaft of the driving gear 25 as a centroid and receiving the rotating shaft of the output gear 27. When the driving gear 25 rotates, the intermediate gear 26 and the output gear 27 rotate on their respective axis and at the same time revolve at the same angular velocity by means of the intermediate gear guide groove 29*a* and the output gear guide groove 29*b* to open or close the air flap 21*a*.

The curved rack gear 28 is fixedly installed in the inside of the engine room 11, for example, the housing 29 in which the air flap unit 21 is installed. The curved rack gear 28 is formed in a curved shape whose height increases toward a tilting direction of the air flap unit 21. For example, if it is contemplated that the lower end of the air flap unit 21 is raised while the lower end of the air flap unit 21 is moved toward the front of the vehicle, the curved rack gear 28 is configured to become higher toward the front of the vehicle.

Inner radius of the curved rack gear 28 is formed to be larger than radius of the sector gear part 27*b*.

Further, the curved rack gear 28 is configured to have a circular arc that is a part of a circular arc taking a rotating center of the drive motor 24 as a centroid.

When the curved rack gear 28 is meshed with the sector gear part 27*b* of the output gear 27 and thus the output gear 27 is rotated, the output gear 27 moves along the curved rack gear 28 while rotating on the center of the output gear 27 whereby the air flap unit 21 is tilted.

Hereinafter, operation of the tiltable active air flap assembly having the features as described above according to one form of the present disclosure is described.

Figure 3:
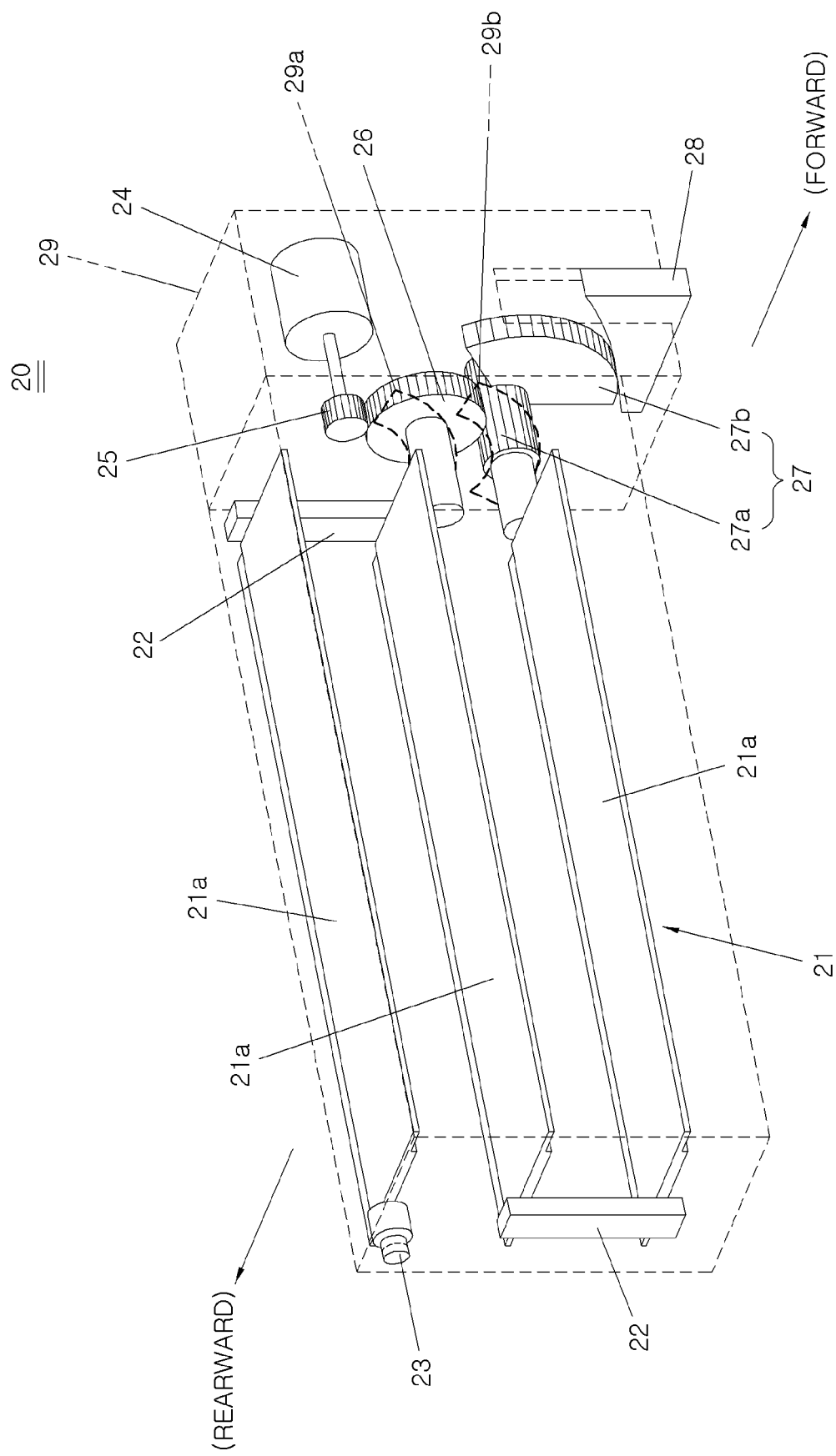
FIG. 3 is a perspective view of a tiltable active air flap assembly according to a form of the present disclosure.
Figure 4:
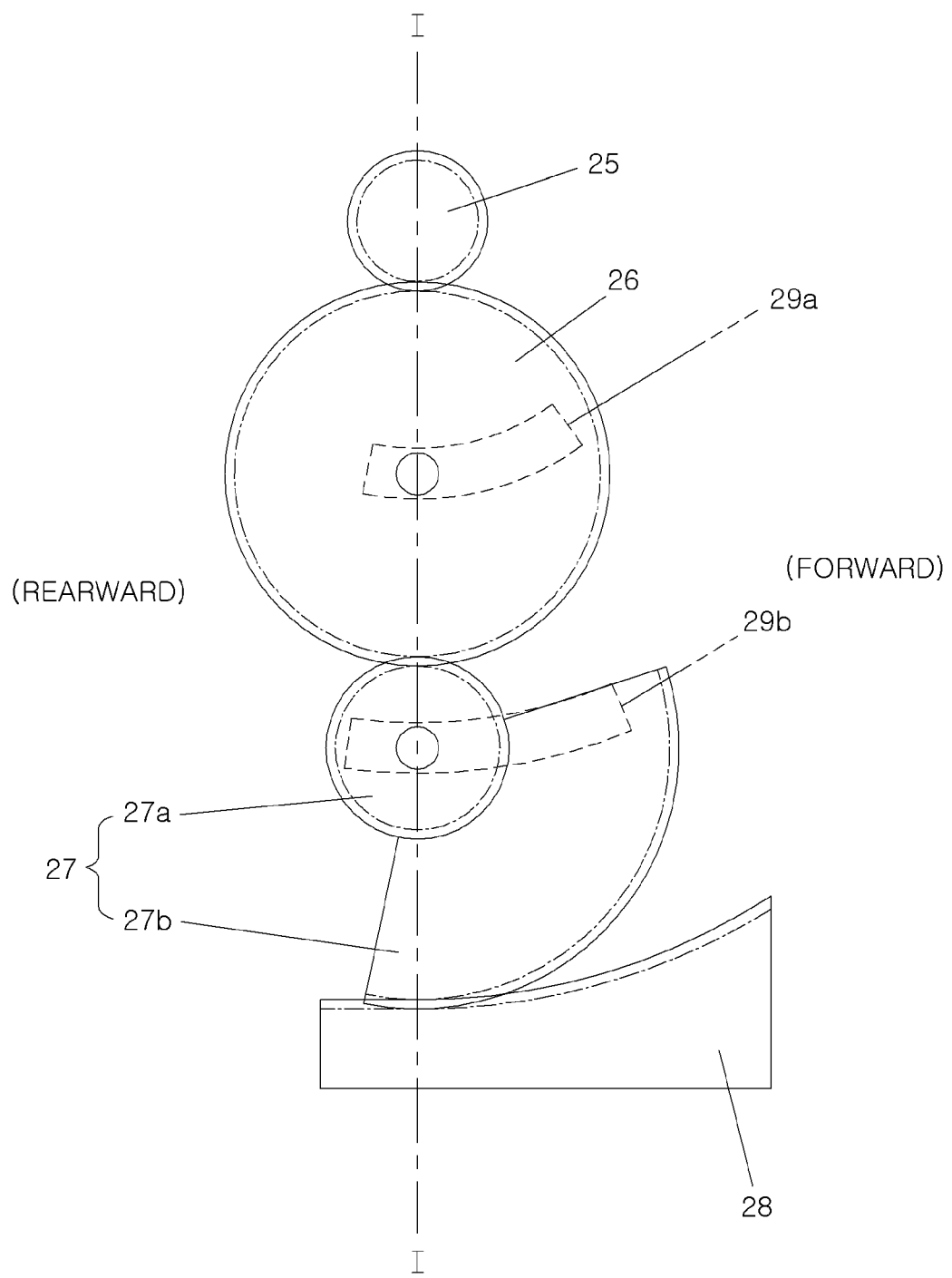
FIG. 4 is a side view showing an arrangement state of an output gear and a curved rack gear in a tiltable active air flap assembly according to a form of the present disclosure.
Figure 5:
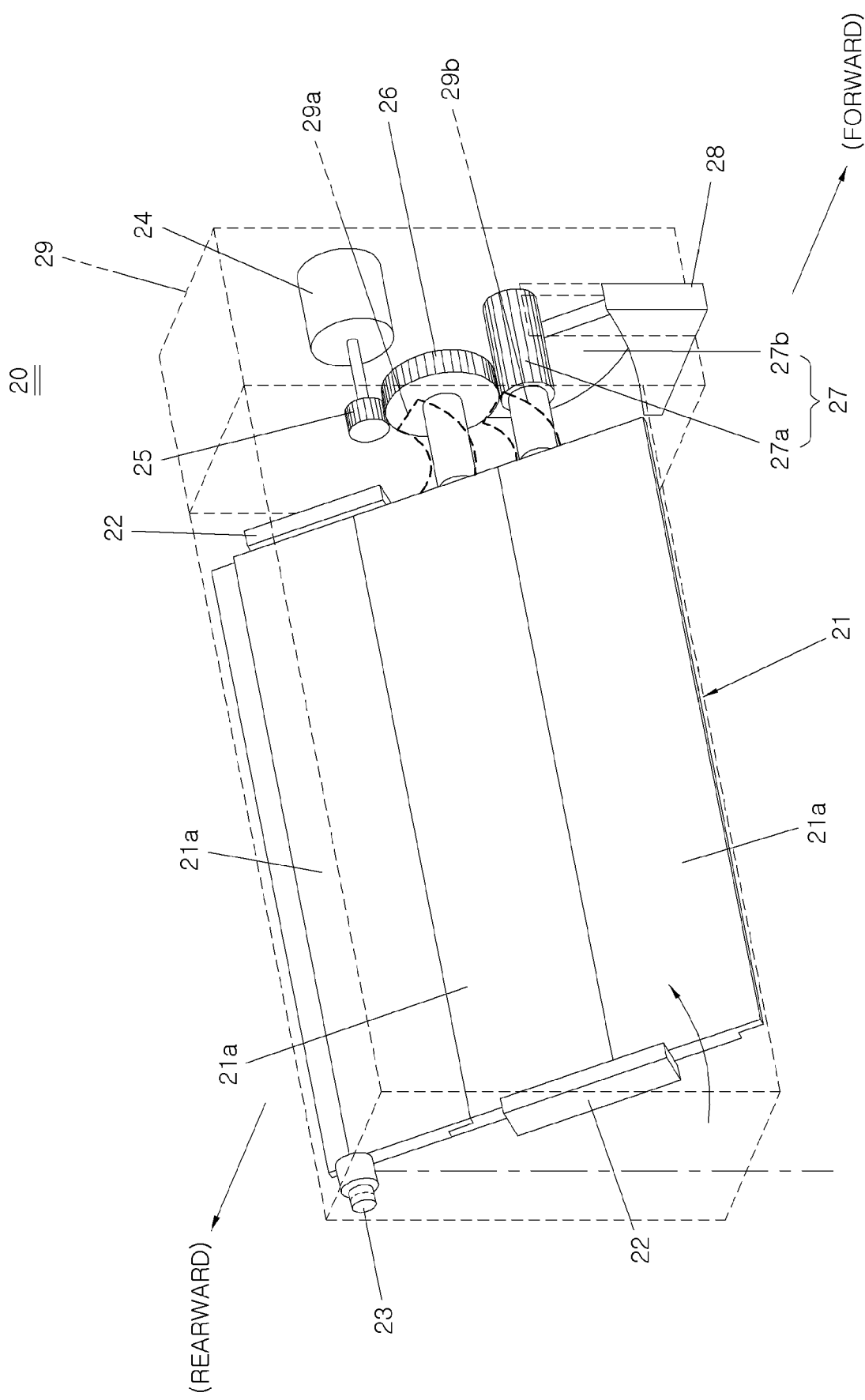
FIG. 5 is a perspective view showing a state in which a tiltable active air flap assembly according to a form of the present disclosure is operated.
Figure 6:
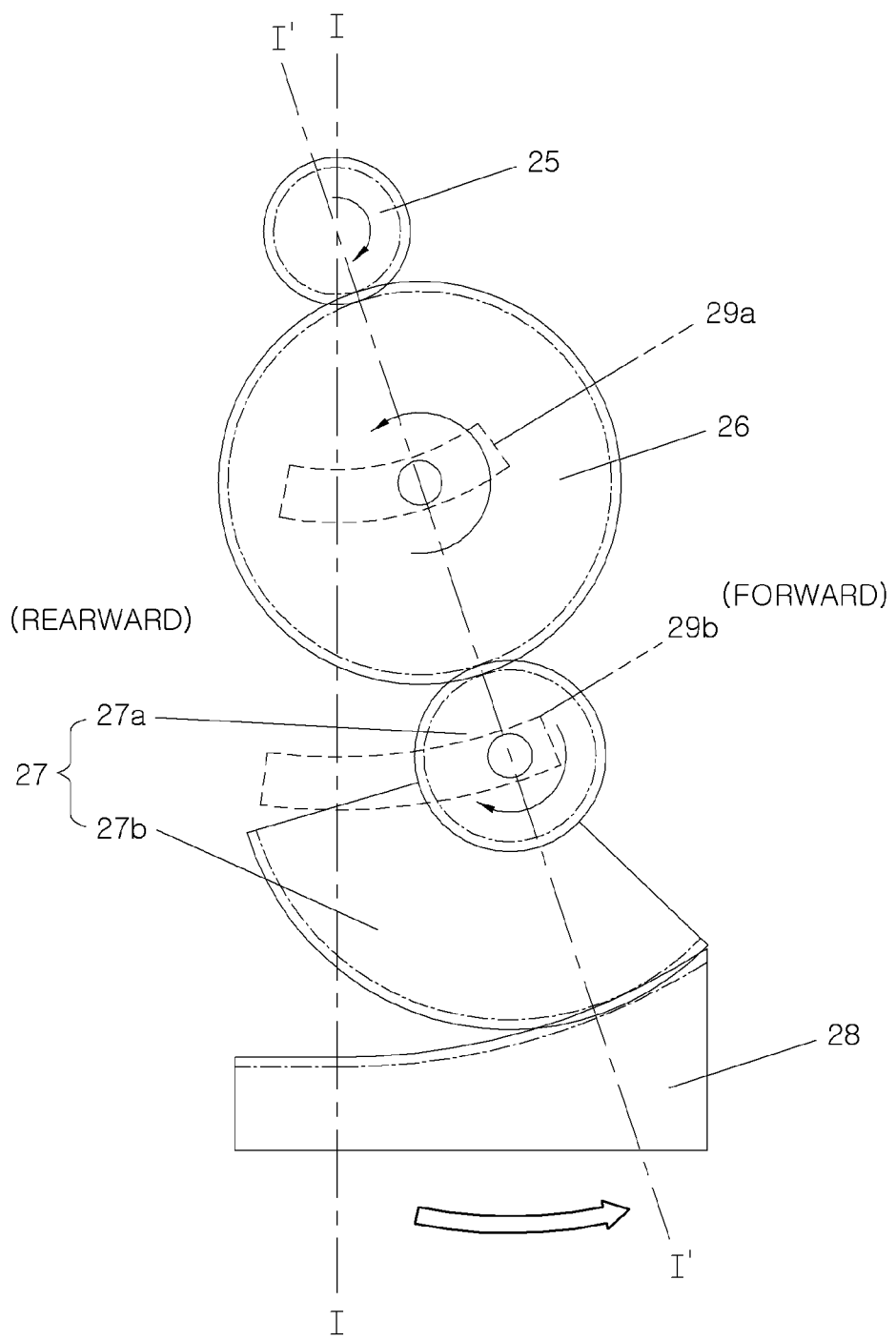
FIG. 6 is a side view showing an arrangement state of an output gear and a curved rack gear when a tiltable active air flap assembly according to a form of the present disclosure is operated.
Figure 7:
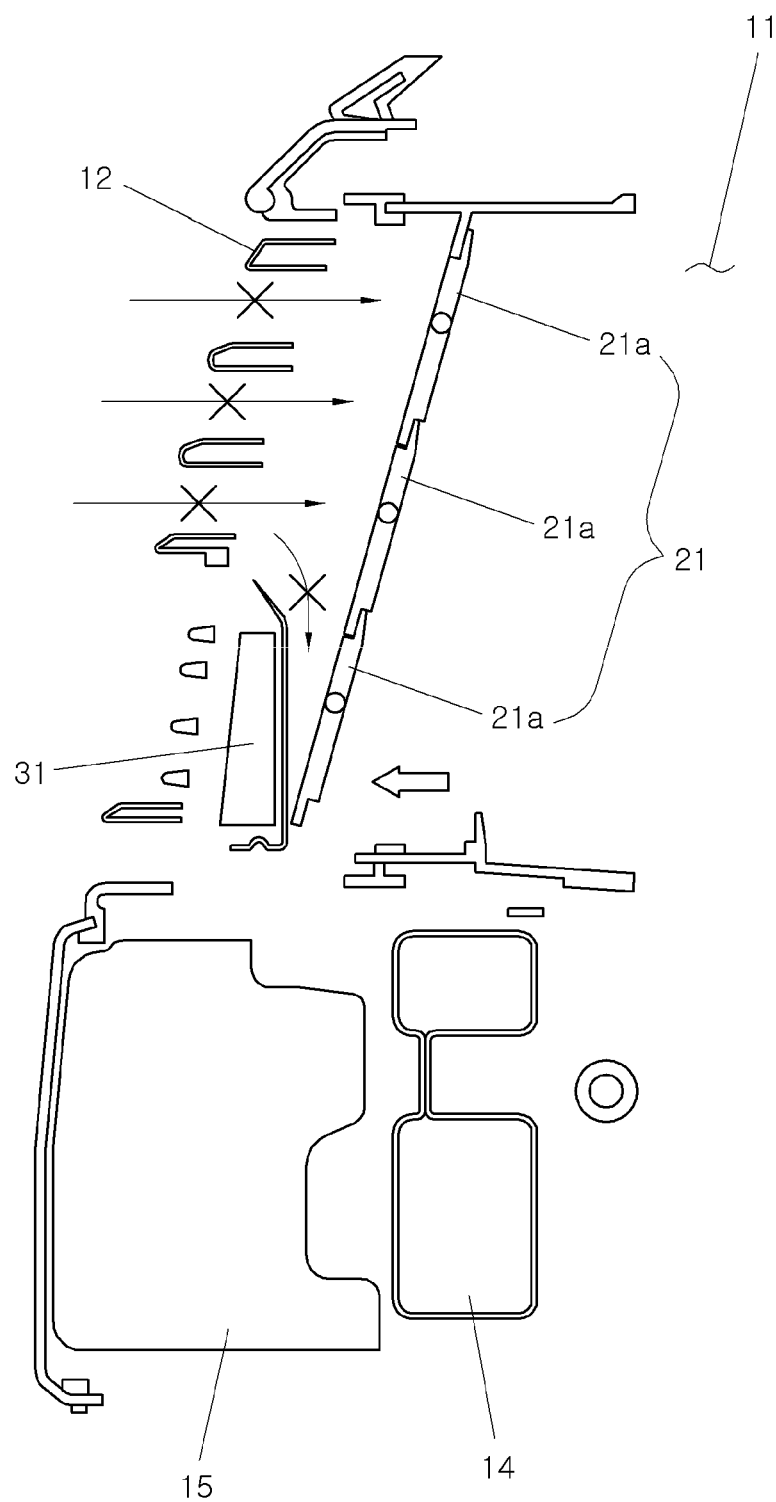
FIG. 7 is a cross-sectional view showing a state in which a tiltable active air flap assembly according to a form of the present disclosure is operated in an engine room.

FIGS. 3 and 4 show a state before the air flap is operated.

Before the air flap is operated, that is, when the radiator grille 12 is opened, the air flaps 21*a* are substantially parallel to the ground so that running wind flows into the engine room 11 through the space between the air flaps 21*a*.

On the other hand, the intermediate gear 26 and the output gear 27 are kept substantially perpendicular to the ground. In particular, the output gear 27 is meshed with the lowest face of the curved rack gear 28.

On the other hand, if the engine is in cold condition or a hybrid vehicle is operating in an electric vehicle mode, it may not be desirable for the running wind to flow into the engine room 11. In this case, the air flaps are operated to block inflow of the running wind through the radiator grille 12.

To this end, electric power is applied to the drive motor 24 to rotate the drive motor 24 and rotational force of the driving motor 24 is transmitted to the air flap unit 21 through the driving gear 25, the intermediate gear 26 and the output gear 27. In the air flap unit 21, the air flaps 21*a* are arranged so as to interlock with each other by interlocking links 22 respectively. Therefore, when rotational force is input from the output gear 27 to any one of the air flaps 21*a*, the air flaps 21*a* start to rotate at the same time.

Thereafter, when the air flaps are rotated to a large or maximum extent, the air flap 21*a* contacts the other air flap 21*a* adjacent to each other in the vertical direction, thereby blocking the running air flowing in through the radiator grille 12.

At this time, the upper or lower end of the air flap unit 21 moves in the front and rear direction of the vehicle and thus the end of the air flap 21*a* contacts surrounding structures or other parts so that air is inhibited from leaking from the periphery of the air flap unit 21, thereby inhibiting the running wind from flowing into the engine room 11.

The air flap unit 21 may be configured such that any one of the upper and lower ends of the air flap unit 21, in some instances the lower end of the air flap unit 21, is moved (or tilted) toward the front of the vehicle by the tilting means whereby the lower end of the air flap unit 21 is brought into close contact with the radiator grille 12.

Now, process of tilting the lower end of the air flap unit 21 is described in detail below.

When the drive motor 24 is driven to rotate the air flaps 21*a*, the air flaps 21*a* are rotated by rotational force transmitted from the driving gear 25 via the output gear 27. At this time, the intermediate gear 26 and the output gear 27 rotate on their respective axis and at the same time revolve around the driving gear 25 while they are guided by means of the guide grooves 29*a* and 29*b*. When the output gear 27 revolves simultaneously with rotation, the rotating shaft of the output gear 27 moves along the curved rack gear 28 because the sector gear part 27*b* of the output gear 27 is in condition that it is meshed with the curved rack gear 28.

The curved rack gear 28 is formed to have a curved surface whose height increases toward the front of the vehicle. Accordingly, when the output gear 27 rotates, the rotating shaft of the output gear 27 moves along the curve of the curved rack gear 28 while the sector gear part 27*b* moves on the curved rack gear 28.

At this time, the lowermost air flap 21*a* coupled to the output gear 27 also moves along the curve of the curved rack gear 28. Since the curved rack gear 28 is formed such that the curve of the curved rack gear 28 ascends toward the front of the vehicle, the air flap 21*a* at the lowermost position rotates in a direction of closing the radiator grille 12 along the curve of the curved rack gear 28 and at the same time moves further forward than the initial position (i.e., position opening the radiator grille).

When the air flap 21*a* at the lowermost position moves toward the front of the vehicle and at the same time the air flaps 21*a* close the radiator grille 12, the air flap 21*a* at the lowermost position is brought into contact with the radiator grille 12 or the back beam 14 supporting the bumper 15, or the like. Since no gap is formed between any one of the air flaps 21*a* and the structures inside the engine room 11 such as the radiator grille 12 or the back beam 14 when the air flap assembly 20 is operated (i.e., when the radiator grille is closed), running wind is inhibited from flowing into the engine room 11, thereby improving aerodynamic performance of the vehicle.

On the other hand, since the driving gear 25, the intermediate gear 26 and the output gear 27 are configured such that their rotating shafts are fixed relatively with each other when the output gear 27 rotates. Accordingly, when the rotating shaft of the output gear 27 revolves around the driving gear 25 while the output gear 27 moves along the curved rack gear 28, the rotating shaft of the intermediate gear 26 revolves around the rotating shaft of the driving gear 25 by the angle at which the rotating shaft of the output gear 27 rotates.

Further, the intermediate gear 26 is configured such that when the rotating shaft of the intermediate gear 26 revolves together with the output gear 27 around the rotating shaft of the driving gear 25 while the output gear 27 moves on the curved rack gear 28, the intermediate gear 26 is also moved so as to transmit rotational force of the drive motor 24 to the output gear 27.

While the present disclosure has been described in connection with what is presently considered to be practical exemplary forms, it is to be understood that the present disclosure is not limited to the disclosed forms, but, on the contrary, it is intended to cover various modification and equivalent arrangements included within the spirit and scope of the present disclosure.

What is claimed is:

1. A tiltable active air flap assembly for controlling air flow through a radiator grille to an engine room of a vehicle, the tiltable active air flap assembly comprising:
   an air flap unit having a plurality of air flaps arranged parallel to each other and configured to rotate simultaneously, such that when the plurality of air flaps is in an open configuration, running wind flows into the engine room through the radiator grille of the vehicle, and when the plurality of air flaps is in a closed configuration, running wind is blocked from the engine room;
   a drive motor;
   a power transmission means for transmitting rotational force of the drive motor to any one of the plurality of air flaps; and
   an tilting means operably connected to a driving gear and coupled to at least one of the plurality of air flaps, and including an output gear configured to move any one of an upper end and a lower end of the air flap unit along a longitudinal direction of the vehicle when each of the air flaps rotates to close the radiator grille,
   wherein:
   the output gear is coupled to a rotating shaft of any one of the air flaps and a curved rack gear configured to mesh with one side of the output gear and installed fixedly in a housing, and
   the output gear comprises a pinion part to which rotational force of the drive motor is input and a sector gear part formed integrally with the pinion part and meshed with the curved rack gear.

2. The tiltable active air flap assembly according to claim 1, wherein a radius of the curved rack gear is larger than that of the sector gear part.

3. The tiltable active air flap assembly according to claim 1, wherein the curved rack gear is formed in a curved shape whose height increases along the longitudinal direction of the vehicle.

4. The tiltable active air flap assembly according to claim 1, wherein a plurality of power transmission means for transmitting rotational force of the drive motor to the output gear are provided between the drive motor and the pinion part.

5. The tiltable active air flap assembly according to claim 4, wherein at least one gear member is provided between the drive motor and the pinion part.

6. The tiltable active air flap assembly according to claim 5, wherein the driving gear is mounted to a rotating shaft of the drive motor and an intermediate gear for transmitting rotational force of the driving gear to the output gear is provided between the driving gear and the pinion part.

7. The tiltable active air flap assembly according to claim 6, wherein an intermediate gear guide groove and an output gear guide groove are formed in the housing to guide revolution of the intermediate gear and the output gear around the driving gear when the intermediate gear and the output gear rotate on their respective axis.

8. The tiltable active air flap assembly according to claim 1, wherein the output gear is coupled to the rotating shaft of the air flap located at the lowermost position out of the air flaps.

9. The tiltable active air flap assembly according to claim 8, wherein one side of the air flap located at the uppermost position out of the air flaps is rotatably installed in the housing.

10. The tiltable active air flap assembly according to claim 8, wherein the curved rack gear is formed in a curved shape whose height increases toward a front of the vehicle.

11. The tiltable active air flap assembly according to claim 1, wherein the plurality of air flaps are configured to interlock with each other by an interlocking link at one of a left end and a right end of at least one of the air flaps.

12. The tiltable active air flap assembly according to claim 10, wherein in an upper portion of the plurality of air flaps, adjacent air flaps are linked to each other by an interlocking link at one of a left end side and a right end side of the air flaps, and in a lower portion of the plurality of air flaps, adjacent air flaps are linked to each other by an interlocking link at the other the left end side and the right end side of the air flaps.

13. A tiltable active air flap assembly for controlling air flow through a radiator grille to an engine room of a vehicle, the tiltable active air flap assembly comprising:
   an air flap unit having a plurality of air flaps arranged parallel to each other and configured to rotate simultaneously, such that when the plurality of air flaps is in an open configuration, running wind flows into the engine room through the radiator grille of the vehicle, and when the plurality of air flaps is in a closed configuration, running wind is blocked from the engine room;

a drive motor;

a driving gear in connection with the drive motor, for transmitting rotational force of the drive motor to any one of the plurality of air flaps; and an output gear operably connected to the driving gear and coupled to at least one of the plurality of air flaps, the output gear configured to move any one of an upper end and a lower end of the air flap unit along a longitudinal direction of the vehicle when each of the air flaps rotates to close the radiator grille, wherein:

the output gear is coupled to a rotating shaft of any one of the air flaps and a curved rack gear configured to mesh with one side of the output gear and installed fixedly in a housing, and the output gear comprises a pinion part to which rotational force of the drive motor is input and a sector gear part formed integrally with the pinion part and meshed with the curved rack gear.

\* \* \* \* \*